United States Patent [19]

DeMartino

[11] 4,169,798

[45] Oct. 2, 1979

[54] WELL-TREATING COMPOSITIONS

[75] Inventor: Ronald N. DeMartino, Wayne, N.J.

[73] Assignee: Celanese Corporation, New York, N.Y.

[21] Appl. No.: 845,000

[22] Filed: Oct. 25, 1977

Related U.S. Application Data

[63] Continuation-in-part of Ser. No. 745,497, Nov. 26, 1976, abandoned.

[51] Int. Cl.$^2$ .............................................. E21B 43/26
[52] U.S. Cl. ................................ 252/8.55 R; 252/316; 536/114
[58] Field of Search ..................... 252/8.55 R, 8.55 C, 252/8.5 C; 536/114, 52

[56] References Cited

U.S. PATENT DOCUMENTS

| | | | |
|---|---|---|---|
| 2,190,179 | 2/1940 | Ziese et al. | 536/120 X |
| 2,609,367 | 9/1952 | Gaver et al. | 536/114 |
| 2,801,218 | 7/1957 | Menaul | 252/8.55 |
| 3,483,121 | 12/1969 | Jordan | 252/8.55 X |
| 3,779,914 | 12/1973 | Nimerick | 252/8.55 |
| 3,912,713 | 10/1975 | Boonstra et al. | 536/114 |
| 3,922,173 | 11/1975 | Misak | 252/8.55 X |
| 3,960,736 | 6/1976 | Free et al. | 252/8.55 |
| 4,021,355 | 5/1977 | Holtmyer et al. | 252/8.55 |

*Primary Examiner*—Herbert B. Guynn

[57] ABSTRACT

This invention provides a novel hydraulic fluid composition adapted for fracturing of subterranean formations, which comprises (1) an aqueous medium, (2) methyl ether of polygalactomannan gum as a gelling agent, and (3) a breaker additive for subsequent reduction of fluid viscosity.

11 Claims, No Drawings

WELL-TREATING COMPOSITIONS

This application is a continuation-in-part of application Ser. No. 745,497, filed Nov. 26, 1976, now abandoned.

BACKGROUND OF THE INVENTION

The productivity of oil and gas wells can be improved by increasing the area of communication within a selected producing zone. The drainage area can be increased by hydraulic fracturing of the producing zone to provide fractures and channels emanating from the well base area into the contiguous subterranean formations.

The hydraulic fracturing process is accomplished by rapid pumping of an aqueous fluid medium down a well which penetrates the subterranean formation where fracturing is desired. The rapid pumping of the aqueous fluid creates a hydrostatic pressure which energizes splitting forces in the confined zone. Pressures as high as 10,000 psi are employed to effect formation fracturing.

As cracks and channels are formed, a propping agent which is suspended in the high viscosity hydraulic fluid penetrates the newly created fissures and becomes lodged therein. The function of the propping agent is to support the fractures in an open position as a conduit for the flow of fluids such as oil, gas or water through the fractured zone. Various non-compressible materials are employed as proppants. These include sand, rounded walnut shells, glass beads, aluminum spheres, and the like. U.S. Pat. No. 3,708,560 proposes polyester resin prills as a proppant in hydraulic fracturing fluid systems.

After a fracturing operation has been completed and the propping agent has been deposited, the hydrostatic pressure is released, the flow of fluid is reversed, and the hydraulic fracturing fluid is withdrawn.

Hence, the hydraulic fracturing fluid composition functions to force fracturing under hydrostatic pressure, and it serves to transport the suspension of propping agent into the porous subterranean formations. The hydraulic well-treating fluid medium must exhibit advantageous viscosity and particulate solids transport properties.

Hydraulic fracturing fluids commonly employ a viscosity incresing agent such as a water-soluble polymer to improve the flow characteristics and the suspending ability of the fluids. Carboxymethylcellulose, polyacrylamide, polyvinylpyrrolidone, guar, tragacanth, Irish moss, modified starch, and the like, have been employed as water-soluble or water-dispersible additives to provide pumpable gels having solids suspending properties. U.S. Pat. Nos. 3,483,121; 3,757,864; 3,779,914; 3,818,998; 3,900,069; 3,971,440; and references cited therein, describe hydraulic well-treating compositions which contain novel polymeric friction-reducing gelling components.

Hydraulic fracturing fluids which contain a natural gum, such as unmodified polygalactomannan gum, commonly include a breaker additive to effect a delayed action thinning out of the fluid medium. This facilitates the subsequent removal of the hydraulic fracturing fluid composition from the fractured formation.

Breaker additives include enzymes which under the well-fracturing conditions in a delayed manner autonomously reduce the hydraulic fluid viscosity by degrading the natural gum incorporated as a gelling agent. U.S. Pat. Nos. 2,681,704; 2,801,218; 3,615,794; 3,684,710; and references cited therein, describe new enzyme compositions, such as mannan depolymerase which is derived from a microbiologic source.

The disadvantage of employing natural gum as a gelling agent in hydraulic fracturing fluids is the lessening of fluid loss control caused by plugging of apertures which reduces the permeability of a fractured formation. In the case where a natural resin such as guar gum is employed as a gelling agent in combination with an enzyme breaker additive in a hydraulic fracturing fluid, the hydraulic system is unsatisfactory because the hydrolysis residue of the natural gum is present in sufficient quantity to create a plugging effect and reduces the permeability of a fractured formation.

Accordingly, it is a main object of the present invention to provide natural gum derivatives having improved viscosity and suspending properties for application as gelling agents in hydraulic well-treating fluid compositions.

It is another object of this invention to provide hydraulic well-treating fluid compositions containing a natural gum derivative in combination with a breaker additive.

It is a further object of this invention to provide hydraulic well-fracturing fluid compositions containing a polygalactomannan ether derivative in combination with an enzyme as a breaker additive, which are characterized by a low yield of hydrolysis residue.

Other objects and advantages of the present invention shall become apparent from the accompanying description and examples.

DESCRIPTION OF THE INVENTION

Polygalactomannan gums are hydrocolloid polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single-membered galactose branches. The mannose units are linked in a 1-4-$\beta$-glycosidic linkage and the galactose branching takes place by means of a 1-6 linkage on alternate mannose units. The ratio of galactose to mannose in the guar polymer is, therefore, one to two. Guar gum has a molecular weight of about 220,000.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1–1.5 percent. Guar gum and locust bean gum as supplied commercially usually have a viscosity (at 1% concentration) of around 1000 to 4000 centipoises at 25° C. using a Brookfield Viscometer Model LVF, spindle No. 2 at 6 rpm.

For the purposes of the present invention, one or more objects are accomplished by the provision of a hydraulic well-treating fluid composition which comprises an aqueous solution containing methyl ether or polygalactomannan gum as a gelling agent, and a breaker additive for reduction of solution viscosity. The preferred hydraulic fluid compositions additionally contain a propping agent such as sand or comminuted walnut shells.

The breaker additive is preferably an enzyme which under formation fracturing conditions autonomously degrades the polygalactomannan methyl ether gum gelling agent so as to reduce the viscosity of hydraulic fluid which is under hydrostatic pressure. Although the effect of the enzyme breaker additive commences immediately upon intimate admixture of the polygalactomannan methyl ether gum and the breaker additive, the time required to reduce the solution viscosity by 50 percent can range over a period between about one half hour and two hours. The rate of polygalactomannan methyl ether gum degradation is affected by pH, temperature, and salt content of the hydraulic fluid system.

The enzyme breaker additive can be employed in a quantity between about 0.01 and 5 weight percent, based on the weight of polygalactomannan methyl ether gum in a hydraulic fluid composition. Hemicellulase enzyme is illustrative of a suitable breaker additive for hydraulic fluid compositions containing methylated guar gum.

Another type of breaker additive compound which can be employed are those which provide an acidic pH to the invention hydraulic well-treating fluid composition. Such breaker additives include inorganic and organic acids, and compounds such as esters which convert to acidic derivatives under well-treating conditions. Illustrative of suitable breaker additives of this type are sulfuric acid, hydrochloric acid, p-toluenesulfonic acid, acetic acid, triethyl phosphate, methyl formate, ethyl propionate, butyl lactate, and the like. This type of breaker additive can be employed in a quantity between about 0.5 and 20 weight percent, based on the weight of polygalactomannan methyl ether gum in a hydraulic fluid composition.

Another type of breaker additive compounds which can be employed are oxidizing agents. Illustrative of suitable breaker additives of this type are ammonium persulfate, potassium dichromate, potassium permanganate, peracetic acid, tertiarybutyl hydroperoxide, and the like. This class of breaker additive can be employed in a quantity between about 0.5 and 20 weight percent, based on the weight of polygalactomannan methyl ether gum in a hydraulic fluid composition.

The above-described clases of breaker additive compounds are known in the art. The selection and application of breaker additives in hydraulic well-treating fluid compositions is describe in U.S. Pat. Nos. 3,922,173; 3,960,736; 4,021,355; and references cited therein; and in *Hydraulic Fracturing*, by G. C. Howard and C. R. Fast, Monograph Series, Volume 2, Society of Petroleum Engineers, Dallas, Tex. (1970).

The polygalactomannan methyl ether gum component of the invention hydraulic fluid compositions is produced by contacting the said gum with a methylating reagent in the presence of a basic compound. The reaction proceeds readily at a temperature between about 0° C. and 100° C.

Suitable methylating reagents include methyl chloride, methyl bromide, methyl iodide, dimethyl sulfate, and the like. The methylating reagent is employed in a quantity sufficient to provide the desired degree of substitution of hydroxyl groups with methoxyl groups, e.g., a degree of substitution (D.S.) between about 0.1 and 1.5, and preferably between about 0.2 and 0.5.

By the term "degree of substitution" as employed herein is meant the average substitution of ether groups per anhydro sugar unit in the polygalactomannan gums. On the average, each of the anhydro sugar units contains three available hydroxyl sites.

The basic compound in the reaction process is employed in a quantity which is at least stoichiometrically equivalent to the strong acid which is generated in situ during the course of the reaction. Suitable basic compounds include inorganic and organic derivatives such as alkali metal and alkaline earth metal hydroxides, quaternary ammonium hydroxides, alkoxides, organic acid salts, and the like. Illustrative of basic compounds are sodium hydroxide, potassium hydroxide, calcium hydroxide, barium hydroxide, sodium carbonate, potassium acetate, sodium methoxide, tetramethylammonium hydroxide, and the like.

In conducting the methylation reaction, it is advantageous to form a slurry of the polygalactomannan gum in an aqueous alkanol medium and effect the reaction without completely hydrating the said gum reactant. This facilitates recovery of the methylated polygalactomannan gum product. After neutralization of any excess basic compound in the reaction medium, the solid gum product is readily recovered by filtration. Methods of preparing saccharidic ether derivatives are disclosed in U.S. Pat. Nos. 2,140,346; 2,609,367; 3,170,915; and in references cited therein.

The quantity of polygalactomannan methyl ether gum incorporated in an invention hydraulic composition can vary in the range between about 0.05 and 5 weight percent based on the weight of the water component. A preferred range is between about 0.1 and 2 weight percent of gum, based on the weight of water.

The present invention hydraulic fluid compositions consisting essentially of (1) an aqueous medium, (2) methyl ether of polygalactomannan gum, (3) an enzyme breaker additive, and (4) a propping agent, are eminently suitable for application as well-fracturing fluid media.

The hydraulic fluid compositions of the present invention exhibit excellent solution stability and heat stability in comparison with the corresponding hydraulic fluid compositions containing unmodified polygalactomannan gum as a gelling agent. The invention hydraulic fluid compositions have superior ability to hydrate and develop high viscosity in the presence of salts. Further, an enzyme breaker additive can hydrolyze the polygalactomannan methyl ether gum at a convenient rate and with a resultant low yield of hydrolysis residue, e.g., a yield of less than about 2 weight percent residue, based on the original weight of polygalactomannan methyl ether gum gelling agent.

The following examples are further illustrative of the present invention. The reactants and other specific ingredients are presented as being typical, and various modifications can be derived in view of the foregoing disclosure within the scope of the invention.

EXAMPLE I

| Preparation Of Methyl Ethers Of Polygalactomannan Gum | | | | |
| --- | --- | --- | --- | --- |
|  | A | A' | B | B' |
| 50% Isopropanol, mls | 1800 | 1800 | 1800 | 1800 |
| Guar gum, grams | 300 | 300 | — | — |
| Locust bean gum, grams | — | — | 300 | 300 |
| 50% Sodium hydroxide, grams | 25 | 50 | 25 | 50 |

-continued

Preparation Of Methyl Ethers Of Polygalactomannan Gum

|  | A | A' | B | B' |
|---|---|---|---|---|
| Methyl bromide | 25 | 50 | 25 | 50 |
| Degree of substitution | 0.2 | 0.3 | — | — |
| CPS, 1% solution | 4310 | 4540 | — | — |

The polyglactomannan gum is slurried in the isopropanol solution in a pressure reactor, heated to 50° C. and purged for one hour. The sodium hydroxide solution is added to the slurry, and the mixture is stirred for ten minutes.

The methyl bromide is slowly metered into the reactor over a period of several hours, while maintaining the reactor pressure below about 20 psi. The reactor is allowed to cool, and the reaction mixture is neutralized to a pH of 7 with acetic acid, filtered, washed with 50% isopropanol, and then with 100% isopropanol. The polygalactomannan methyl ether product is recovered and air-dried.

EXAMPLE II

Oil Well Fracturing, Insoluble Residue Test

Guar gum methyl ether (D.S. of 0.3) produced in accordance with Formulation A hereinabove is dissolved in 400 mls of water to form a 0.5% aqueous solution. To the solution is added 0.01% by weight of hemicellulase enzyme, and the solution is aged overnight at 30° C., and then centrifuged. Supernatant liquid is decanted, and insoluble residue is recovered. The residue is slurried with water, then the residue is speatated from the liquid, dried and weighed.

In the same manner a commercial guar gum is subjected to enzyme treatment, and residual solid is recovered and weighed for comparison purposes.

The weight of the insoluble residue from the invention guar gum methyl ether after enzyme treatment is 1.4%, based on the original weight of guar gum methyl ether.

By comparison, the weight of the insoluble residue from the commercial guar gum after similar enzyme treatment is 10.8%.

The Insoluble Residue Test can be conducted in the same manner employing an acid, ester or oxidizing compound as the breaker additive, e.g., sulfuric acid, potassium permanganate or methyl formate.

This comparison demonstrates that methyl ether of polygalactomannan gum is better adapted than commercial polygalactomannan gum for application as a gelling agent in hydraulic well-fracturing fluid compositions. Polygalactomannan methyl ether gum is superior to unmodified polygalactomannan gum because under oil wel fracturing conditions it is more heat stable and it leaves much less clogging residue after enzyme treatment.

EXAMPLE III

Hydration of Guar Methyl Ether Gum In A Salt Solution

The viscosity (CPS) of a 1% solution of guar gum methul ether (D.S. of 0.3) was measured in comparison with guar gum.

|  | Guar Methyl Ether | Guar |
|---|---|---|
| Water | 4540 | 4600 |
| 10% Calcium chloride | 4680 | 4300 |

Guar methyl ether gum hydrates to a greater degree than does guar gum in a salt solution.

Also, it has been found that guar gum does not hydrate in 50% aqueous methanol, while under the same conditions guar gum methyl ether hydrates and the solution develops higher viscosity.

What is claimed is:

1. A hydraulic well-treating fluid composition which comprises an aqueous solution containing methyl ether of polygalactomannan gum as a gelling agent, and a breaker additive for reduction of solution viscosity, wherein the methyl ether of polygalactomannan gum has a degree of substitution between about 0.1 and 1.5.

2. A composition in accordance with claim 1 wherein the methyl ether of polygalactomannan gum is present in a quantity between about 0.05 and 5 weight percent, based on the weight of water.

3. A composition in accordance with claim 1 wherein the methyl ether of polygalactomannan gum is methyl ether of guar gum.

4. A composition in accordance with claim 1 wherein the methyl ether of polygalactomannan gum is methyl ether of locust bean gum.

5. A hydraulic well-fracturing fluid composition comprising (1) an aqueous medium, (2) methyl ether of polygalactomannan gum as a gelling agent, having a degree of substitution between about 0.1 and 1.5, (3) a breaker additive for subsequent autonomous reduction of the gelling properties of the methyl ether of glactomannan gum and (4) a propping agent.

6. A hydraulic well-fracturing fluid composition in accordance with claim 5 wherein the gelling agent is methyl ether of guar gum.

7. A hydraulic well-fracturing fluid composition in accordance with claim 5 wherein the gelling agent is methyl ether of locust bean gum.

8. A hydraulic well-fracturing fluid composition in accordance with claim 5 wherein the breaker additive is an enzyme.

9. A hydraulic well-fracturing fluid composition in accordance with claim 5 wherein the breaker additive is an acid or ester compound.

10. A hydraulic well-fracturing fluid composition in accordance with claim 5 wherein the breaker additive is an oxidizing compound.

11. A hydraulic well-fracturing fluid composition in accordance with claim 5 wherein the propping agent is sand.

* * * * *